2,863,832
Patented Dec. 9, 1958

2,863,832
METHOD OF ACIDIZING PETROLIFEROUS FORMATIONS

Richard L. Perrine, Fullerton, Calif., assignor to California Research Corporation, San Francisco, Calif., a corporation of Delaware No Drawing. Application May 14, 1954
Serial No. 429,993

11 Claims. (Cl. 252—8.55)

This invention relates to methods for increasing the production of petroleum from subterranean formations penetrated by well bores, and is more specifically concerned with the treatment of such formations with acid to effect an increase in fluid production.

Frequently, it is desirable to increase the effective permeability of a subterranean formation penetrated by a well bore to thereby increase the production of fluid therefrom. Such permeability increase may be necessitated by the fact that the formation has a low natural permeability, or the permeability may have been decreased by abnormal conditions in the well bore, such as the presence of drilling mud or other material used in drilling the well; the presence of scale of an inorganic nature; the presence of carbonates or waxy or asphaltic deposits; or the blocking of the formation near the well bore by water. Numerous methods have been proposed to effect such a permeability increase, including various methods of introducing acid into the formation to remove the obstruction. In most of such prior art acidizing methods, an aqueous solution of an acid is injected into the formation in an effort to dissolve the obstructing material. However, this method has the disadvantage of producing water blocking of the treated formation by the introduction of the extraneous water and has the further disadvantage of producing an ineffective acidizing action because the acid is largely neutralized by calcareous material immediately adjacent the well bore before the acid can reach the desired portion of the formation. An additional limitation of this method is that the inorganic acids utilized may precipitate asphalts from the crude oil in the formation and thus produce plugging of the formation.

In other of such acidizing methods, an inorganic acid or a substance capable of forming an inorganic acid upon reaction with water is introduced into the well in a non-aqueous carrier, and then an aqueous fluid is injected into the well to condition or form the acid for dissolving obstructing material. However, this method has the disadvantage of tending to produce water-blocking of the treated formation and has the further disadvantage, as mentioned above in connection with aqueous solutions of inorganic acids, that the strong inorganic acids may precipitate asphalts from the crude oil in the formation.

An additional prior art method utilizes an acidizing solution containing an aqueous solution of an acid as the dispersed phase in an emulsion of acid solution in oil in an effort to avoid water-blocking of the treated formation. The use of an emulsion, however, has the disadvantage of often requiring special equipment and techniques to form, and of requiring the use of emulsion-stabilizing substances or special relatively readily-emulsified ingredients. Also, once a stable emulsion is formed, it is often difficult to cause the emulsion to break at the desired time and the desired place in the treated formation.

In a copending application, Serial No. 383,931, filed October 2, 1953, in the name of Irving Fatt and Joseph F. Chittum, there is disclosed a method of acidizing a subterranean formation utilizing a solution of an organic acid and a liquid hydrocarbon. The solution is injected into the formation to be treated and contacts the connate water therein, causing the acid to diffuse from the hydrocarbon carrier and form an aqueous acidizing solution with the connate water. This method has the advantage that substantially no water is introduced into the well bore to cause possible water-blocking of the producing formation. An additional advantage of this method is that the liquid hydrocarbon carrier acts as a flushing agent to increase the oil saturation of the portion of the formation adjacent the well bore.

The method disclosed and claimed in the above-identified application is very effective and represents a considerable improvement over the acidizing methods described earlier. However, this method is subject to a limitation with respect to the amount of organic acid which may be dissolved in the liquid hydrocarbon carrier if the carrier has a significant amount of water therein. Even substantially anhydrous organic acids, such as glacial acetic acid and anhydrous formic acid, have a limited solubility in liquid hydrocarbons having significant water content. Additional limitations of the above method are that the organic acids are corrosive to metal parts which they contact in injection into the well, and that the organic acids, particularly glacial acetic acid, may freeze in storage and thereby present serious handling problems.

Broadly, the present invention contemplates a method of increasing the productivity of a formation containing petroliferous deposits by utilizing a solution comprising a liquid hydrocarbon carrier and a selected organic substance capable of producing an organic acid upon contacting water. The organic substance utilized is selected on the basis of its ready solubility in a liquid hydrocarbon containing an appreciable amount of water. I have found that the most suitable such substances are the organic carboxylic acid anhydrides, and particularly, acetic anhydride. The acetic anhydride and the liquid hydrocarbon form a solution which is introduced into the well bore to contact the connate water in the formation, resulting in a diffusion of the acetic anhydride from the hydrocarbon carrier into the connate water to thereby form acetic acid for acidizing the formation. The use of a liquid hydrocarbon carrier provides a beneficial flushing action to increase the oil saturation in the portion of the formation adjacent the well bore, and, additionally, when the liquid hydrocarbon is highly aromatic, a substantial amount of wax in the formation can be dissolved to provide an increase in effective permeability.

It is therefore an object of this invention to provide an improved method of stimulating the petroleum output of a subterranean formation by acidization.

It is an additional object of the present invention to provide a method of acidizing petroliferous formations using a solution comprising a liquid hydrocarbon and a selected organic substance capable of producing an organic acid upon contact with connate water in the formation.

It is a further object of this invention to provide a method of acidizing petroliferous formations using a solution comprising a liquid hydrocarbon and a selected anhydrous organic substance capable of producing an organic acid upon contact with connate water in the formation.

It is an additional object of the present invention to provide a method of acidizing a petroliferous formation utilizing a solution comprising a liquid hydrocarbon carrier and acetic anhydride.

It is an additional object of this invention to provide a method of acidizing a petroliferous formation utilizing a solution comprising a liquid hydrocarbon obtained by extraction of a petroleum fraction with a polar solvent and a selected organic substance capable of producing an organic acid upon contact with the connate water in the formation.

Objects and advantages other than those described above will be apparent from the following detailed description.

In practicing this invention, the liquid hydrocarbon and the organic acid-producing substance are preferably mixed together outside of the well bore to form the solution for acidizing. The liquid hydrocarbon utilized may be of any suitable type, such as crude oil, diesel fuel oil, kerosene or other petroleum fractions or compounds. If it is desired to remove deposited waxes in the formation in the acidizing operation, the liquid hydrocarbon carrier may be selected on the basis of its wax-dissolving characteristics. Suitable wax dissolving hydrocarbons include the aromatic hydrocarbons, such as benzene, toluene, xylene, etc. Additionally, solvents including the ketones, such as methyl ethyl ketone and methyl isobutyl ketone; and halogenated hydrocarbons, such as ethylene dichloride and trichloroethylene, are very satisfactory. Particularly useful are the mixtures of aromatic hydrocarbons obtained by the extraction of petroleum fractions with various polar solvents such as sulfur dioxide, furfural, phenol, cresylic acids, dichloroethyl ether, etc. Especially desirable from among the latter group are the aromatic extracts obtained from the extraction with sulfur dioxide of the middle petroleum fractions such as kerosene, diesel fuel and like stocks. Also useful as a liquid hydrocarbon carrier are the aromatic materials obtained as heavy bottoms in catalytic reforming of gasoline stocks, such as those produced with the aid of platinum catalysts.

The amount of the selected organic acid-producing substance to be mixed with the liquid hydrocarbon is determined by the conditions to be encountered in the treated formation. The lower limit of the concentration of the substance in the solution is determined by the amount of the substance required to obtain a reasonable increase in the permeability of the formation. The upper limit of the concentration of the acid-producing substance is determined by the amount which can be dissolved in a given amount of the liquid hydrocarbon, which, in turn, is determined by the solubility of the substance in the hydrocarbon and by the amount of water present in the hydrocarbon.

Assuming that the selected organic acid-producing substance is acetic anhydride, the acetic anhydride and liquid hydrocarbon components are mixed to form a solution. This solution is injected into the well bore in contact with the formation to be treated, and pressure is maintained on the solution to force it into the formation. When the solution is injected into the formation, it comes in contact with the connate water therein, and acetic anhydride diffuses from the hydrocarbon carrier and reacts with the connate water to form acetic acid. Large surfaces of the connate water and the acetic anhydride-in-hydrocarbon solution are in contact with each other, resulting in an effective transfer of the anhydride from the hydrocarbon to the water to form acetic acid. An aqueous acidizing solution is thus formed in the formation without introducing any additional water therein, so that there is no risk of causing water-blocking of the treated formation. An additional advantage of the use of an acid anhydride is that the reaction of the anhydride with formation carbonates does not produce additional water in the formation as a product of the reaction. The use of a crude oil or a refined fraction thereof as a liquid hydrocarbon carrier also results in a beneficial flushing of the formation adjacent the well bore to increase the oil saturation therein. The acidizing mixture may be permitted to remain in contact with the formation for an extended period of time before removal, to insure substantially complete acidizing of the formation.

The use of acetic anhydride as the acid-producing substance permits the use of liquid hydrocarbons having substantial water contents without seriously affecting the solubility of the anhydride in the hydrocarbon carrier. Up to substantially 16% water (by volume of the anhydride) can be combined chemically with the anhydride, forming acetic acid and leaving the anhydrous acetic acid for solution in the oil. In this connection, only about 5% of water by volume can be disolved rapidly in the anhydride at surface temperatures commonly encountered. However, when the solution is heated to the formation temperature by injecting the solution into the well bore, the water, in amounts substantially up to 16% by volume of the anyhydride, is combined chemically with the anyhydride.

When the acetic anhydride is mixed with a liquid hydrocarbon carrier having an appreciable water content, the combination may be in two phases at surface conditions; an acid-in-oil phase and an acid-in-water phase. The turbulence created by forcing the mixture down the well bore for injection, plus a part of the temperature increase caused by the elevated formation temperature, are sufficient to produce a complete reaction of the water with the anhydride up to the stoichiometric amount of water. Thus, the two phases at the surface can be injected into the formation as a single phase consisting of an anhydrous solution of acetic acid, acetic anhydride and the liquid hydrocarbon carrier. When the single phase reaches the formation, the remaining acetic anhydride reacts with the connate water therein to form acetic acid. Because acetic acid is considerably more soluble in water than in any of the hydrocarbon carriers used, the acetic acid diffuses out of the liquid hydrocarbon carrier into the connate water to produce an effectvie acidizing liquid.

I have found that the most desirable liquid hydrocarbon carriers for acetic anhydride appear to be the aromatic extracts obtained by extracting the middle petroleum fractions of kerosene or diesel fuel oil with sulfur dioxide. The $SO_2$ extracts of kerosene and diesel fuel oil have very good wax-dissolving characteristics, are relatively economical compared to most other liquid hydrocarbons, and readily dissolve acetic anhydride and organic acids which may be used in the acidizing process. The solubility of both acetic anhydride and acetic acid in these two extracts is substantially unlimited, so that any desired amount of the acid or the anhydride can be dissolved therein, thereby reducing the amount of solvent required to dissolve a given amount of the anhydride or acetic acid.

Owing to the limited solubility of acetic anhydride in water at surface temperatures, the presence of water in these $SO_2$ extracts does not appreciably affect the solubility of the acetic anhydride in these extracts at surface conditions. However, at the temperatures encountered when the solution is injected into the formation to be treated, the acetic anhydride reacts in the presence of water to form acetic acid. This acetic acid is quite soluble in the hydrocarbon extracts but is of infinite solubility in the water, and therefore substantially all of the acetic acid is dissolved in the water phase as acetic acid under formation conditions.

The use of acetic anhydride is also very desirable from the standpoint of corrosion of metal in the well bore, such as tubing, sucker rods, casing, etc. Acetic anhydride is also very desirable from the standpoint of remaining a liquid at low temperatures, since the melting point of acetic anhydride is —99° F. Therefore, acetic anhydride remains a liquid and readily pumpable at all practical temperatures which would be encountered in well acidizing operations.

A possible explanation for the increased effectiveness of the method of this invention in increasing the oil permeability of sandstone reservoirs containing connate water is as follows. It appears that in a water-wet sandstone, which condition is representative of the major portion of the surface of most sandstone reservoirs, the water covers the surface of the sand and cementing particles and is accumulated in the interstices, while the oil or gas present appears to be in the center of the pore spaces. When the solution of this invention, comprising a selected organic substance and a liquid hydrocarbon, is injected into the reservoir or formation, for a given pressure of such injection, the volume of water present in a given bulk volume of the reservoir will be determined by the size and shape of the pores in the reservoir and the interfacial tension. This volume of water present will affect the oil permeability of the reservoir.

As the anhydride-in-hydrocarbon solution is injected into the formation, the anhydride diffuses into the water in the reservoir and the acidified water reacts with the solid carbonate material of the reservoir. This reaction produces bubbles of carbon dioxide gas in the water and the volume of these bubbles adds to the apparent volume of the water present. However, the apparent volume of the water cannot be greater than the actual volume thereof at the start of the treatment, because of the necessity for capillary equilibrium between the water and oil at the given injection pressure. Therefore, the gas bubbles force an equal volume of water ahead of the injected acidizing solution, which, in a radial oil well system, results in the water being moved back into the formation or reservoir away from the well bore. The gas bubbles in the water soon either go into solution in the water or cross the oil-water interface and flow with the oil. The volume of the water remaining in the treated portion of the formation is therefore decreased below the volume predicted for equilibrium at the given injection pressure.

This reduction in water content acts to increase the effective oil permeability of the reservoir near the well bore, since the water which is forced away from the well bore by the gas bubble pressure is not as effective in reducing oil permeability in its new position as when it was in the critical permeability zone adjacent the well bore. Thus, the method of this invention acts to dissolve carbonates present in the formation, remedies water-blocking of the formation adjacent the well bore, and flushes the formation adjacent the well bore with the liquid hydrocarbon acting as a carrier for the anhydride. Additionally, when the liquid hydrocarbon utilized is highly aromatic, large quantities of wax can be dissolved from the portion of the formation adjacent the well bore.

Although but a few illustrative embodiments of the present invention have been described, it will be apparent to those skilled in the art that various changes and modifications may be made therein without departing from the spirit of the invention or the scope of the appended claims.

I claim:

1. The method of increasing the productivity of a subterranean formation containing connate water and penetrated by a well bore comprising the steps of introducing into said well bore in contact with said formation a liquid hydrocarbon containing in solution an organic carboxylic acid anhydride capable of forming an acid upon reaction with said connate water at formation conditions, said anhydride being present in an amount to produce sufficient acid to increase substantially the productivity of the subterranean formation by reaction therewith, and contacting the solution with said connate water to release said anhydride from said solution to acidize said formation.

2. The method of increasing the productivity of a subterranean formation containing connate water and penetrated by a well bore comprising the steps of introducing into said well bore in contact with said formation a solution of a liquid hydrocarbon and acetic anhydride, said anhydride being present in an amount to produce sufficient acid to increase substantially the productivity of the subterranean formation by reaction therewith, and contacting the solution with said connate water to release said anhydride from said solution to acidize said formation.

3. The method of increasing the productivity of a subterranean formation containing connate water and penetrated by a well bore comprising the steps of forming a solution of a liquid hydrocarbon and an organic carboxylic acid anhydride soluble in said hydrocarbon and capable of forming an acid upon reaction with said connate water at formmation conditions, said anhydride being present in an amount to produce sufficient acid to increase substantially the productivity of the subterranean formation by reaction therewith, introducing said solution into said well bore in contact with said formation, and contacting said solution with said connate water to release said organic carboxylic acid anhydride from said solution to acidize said formation.

4. The method in accordance with claim 3 wherein said organic carboxylic acid anhydride is acetic anhydride.

5. The method of increasing the productivity of a subterranean formation containing connate water and penetrated by a well bore comprising the steps of forming a solution in an extract produced by extraction of a petroleum hydrocarbon fraction with a polar solvent, of an organic carboxylic acid anhyride soluble in said extract and capable of forming an acid upon reaction with said connate water at formation conditions, said anhydride being present in an amount to produce sufficient acid to increase substantially the productivity of the subterranean formation by reaction therewith, introducing said solution into said well bore in contact with said formation, and contacting said solution with said connate water to release said anhydride from said solution to acidize said formation.

6. The method in accordance with claim 5 wherein said organic carboxylic acid anhydride is acetic anhydride.

7. The method in accordance with claim 5 wherein said extract is obtained by extraction of a petroleum fraction with sulfur dioxide.

8. The method in accordance wtih claim 5 wherein said extract is obtained by extraction of kerosene with sulfur dioxide.

9. The method in accordance with claim 5 where said extract is obtained by extraction of diesel fuel with sulfur dioxide.

10. The method of increasing the productivity of a subterranean formation containing connate water and penetrated by a well bore comprising the steps of forming a solution of acetic anhydride in an extract obtained by extraction of a petroleum hydrocarbon fraction with sulfur dioxide, said anhydride being present in an amount to produce sufficient acid to increase substantially the productivity of the subterranean formation by reaction therewith, introducing said solution into said bore adjacent to said formation, and contacting said solution with said connate water to release said anhydride from said solution to acidize said formation.

11. The method of increasing the productivity of a subterranean formation containing connate water and penetrated by a well bore comprising the steps of forming a solution of an organic acid anhydride in an extract obtained by extraction of a petroleum hydrocarbon fraction with a polar solvent, said acid being water soluble and being present in an amount to increase substantially the productivity of the subterranean formation by reaction therewith, introducing said solution into said well bore in contact with said formation, and contacting said solution with said connate water to release said acid anhydride from said solution to acidize said formation.

References Cited in the file of this patent

UNITED STATES PATENTS

| | | |
|---|---|---|
| 2,059,459 | Hund et al. | Nov. 3, 1936 |
| 2,206,187 | Herbsman | July 2, 1940 |
| 2,343,136 | Dobson et al. | Feb. 29, 1944 |
| 2,681,889 | Menaul | June 22, 1954 |

UNITED STATES PATENT OFFICE
CERTIFICATE OF CORRECTION

Patent No. 2,863,832                                                    December 9, 1958

Richard L. Perrine

It is hereby certified that error appears in the printed specification of the above numbered patent requiring correction and that the said Letters Patent should read as corrected below.

Column 4, line 7, for "headed" read -- heated --; column 6, line 40, for "where" read -- wherein --.

Signed and sealed this 17th day of March 1959.

(SEAL)
Attest:

KARL H. AXLINE                                                 ROBERT C. WATSON
Attesting Officer                                           Commissioner of Patents